(12) United States Patent
Hipp et al.

(10) Patent No.: US 9,507,748 B2
(45) Date of Patent: Nov. 29, 2016

(54) PLATFORM RUNTIME ABSTRACTION

(75) Inventors: Burton Akira Hipp, El Granada, CA (US); Rajeev Bharadhwaj, Saratoga, CA (US); Travis S. Tripp, Fort Collins, CO (US); Kevin L. Wilson, Fort Collins, CO (US); Michael Haeuptle, Rocklin, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 114 days.

(21) Appl. No.: 14/375,018

(22) PCT Filed: Apr. 26, 2012

(86) PCT No.: PCT/US2012/035138
§ 371 (c)(1),
(2), (4) Date: Jul. 28, 2014

(87) PCT Pub. No.: WO2013/162561
PCT Pub. Date: Oct. 31, 2013

(65) Prior Publication Data
US 2015/0012669 A1    Jan. 8, 2015

(51) Int. Cl.
*G06F 15/16*  (2006.01)
*G06F 9/44*   (2006.01)
*G06F 9/445*  (2006.01)

(52) U.S. Cl.
CPC ............. *G06F 15/16* (2013.01); *G06F 8/20* (2013.01); *G06F 8/36* (2013.01); *G06F 8/67* (2013.01); *G06F 9/44* (2013.01)

(58) Field of Classification Search
CPC ............ G06F 15/16; G06F 8/67; G06F 8/36; G06F 8/20; G06F 9/44
USPC ......................................................... 709/250
See application file for complete search history.

(56) References Cited

U.S. PATENT DOCUMENTS 6,701,383 B1 *  3/2004  Wason ................... G06Q 10/10
                                                    375/E7.025
7,644,145 B2 *  1/2010  Rockwell ........... G06Q 10/0875
                                                        358/1.15

(Continued)

FOREIGN PATENT DOCUMENTS

CN        101916321 A     12/2010
IN        017878CH2011    10/2011
WO        WO-2012031419 A1  3/2012

OTHER PUBLICATIONS

Supplementary European Search Report, Sep. 7, 2015, European Patent Application No. 12875211.0, 8 pages.

(Continued)

*Primary Examiner* — Kostas Katsikis
(74) *Attorney, Agent, or Firm* — Brooks, Cameron & Huebsch, PLLC (57) ABSTRACT

Platform runtime abstraction can include creating a number of template models within a platform wherein the number of template models correspond to a provider mode and creating a number of abstraction layers that allow a provider to plug into the platform at runtime wherein the provider includes a provider sub-system and the provider model. Platform runtime abstraction can also include allowing the provider to plug into the platform at runtime through one of the number of abstraction layers wherein the provider remains independent of the platform and wherein the provider remains independent of a platform hardware infrastructure and a platform operating system infrastructure.

20 Claims, 7 Drawing Sheets

(56) References Cited

U.S. PATENT DOCUMENTS

| | | | |
|---|---|---|---|
| 7,890,543 B2 | 2/2011 | Hunt et al. | |
| 8,099,472 B2 | 1/2012 | Mahaffey et al. | |
| 8,613,002 B2* | 12/2013 | Narayanan | G06F 9/542 719/328 |
| 8,706,800 B1* | 4/2014 | Ahmed | G06F 9/468 709/201 |
| 2005/0125771 A1* | 6/2005 | Vitanov | G06F 8/35 717/104 |
| 2006/0020679 A1 | 1/2006 | Hinton et al. | |
| 2006/0048097 A1* | 3/2006 | Doshi | G06F 8/315 717/120 |
| 2006/0129605 A1* | 6/2006 | Doshi | G06F 8/24 |
| 2007/0011126 A1 | 1/2007 | Conner et al. | |
| 2007/0207792 A1* | 9/2007 | Loving | G06F 9/545 455/418 |
| 2008/0141237 A1* | 6/2008 | Elad | G06F 8/67 717/171 |
| 2009/0313004 A1* | 12/2009 | Levi | G06F 8/30 703/28 |
| 2010/0077386 A1* | 3/2010 | Akkiraju | G06F 8/35 717/136 |
| 2010/0100591 A1* | 4/2010 | Mahaffey | G06F 15/16 709/204 |
| 2010/0110933 A1* | 5/2010 | Wilcock | G06Q 10/10 370/255 |
| 2010/0114618 A1* | 5/2010 | Wilcock | G06Q 10/06 705/7.37 |
| 2010/0198730 A1* | 8/2010 | Ahmed | G06F 17/30528 705/50 |
| 2010/0268581 A1 | 10/2010 | Biancardini et al. | |
| 2010/0319004 A1 | 12/2010 | Hudson et al. | |
| 2011/0087726 A1 | 4/2011 | Shim et al. | |
| 2011/0231899 A1 | 9/2011 | Pulier et al. | |
| 2012/0191844 A1* | 7/2012 | Boyns | G06Q 30/0282 709/224 |
| 2012/0330640 A1* | 12/2012 | Alpem | G06F 9/44521 703/23 |
| 2013/0125092 A1* | 5/2013 | Liu | G06F 8/30 717/108 |
| 2013/0332343 A1* | 12/2013 | Desai | G06Q 20/08 705/39 |
| 2015/0007197 A1* | 1/2015 | Tripp | G06F 9/46 718/106 |

OTHER PUBLICATIONS

CA Automation Suite for Hybrid Clouds, Product Sheet, Mar. 2012 (date of search report), 5 pages. http://www.ca.com/~/media/Files/productbriefs/43-autom-suite-hybrid-cloud-ps-v3-1010.pdf.

Cloupia—Converged Infrastructure Automation, May 2012, 2 pages. http://www.cloupia.com/en/converged-infrastructure-automation.htm.

Korean Intellectual Property Office, International Search Report and Written Opinion, Jan. 2, 2013, 10 pages, Daejeon Metropolitan City, Republic of Korea.

* cited by examiner

PLATFORM RUNTIME ABSTRACTION

CROSS-REFERENCE TO RELATED APPLICATION

This application is a national stage application under 35 U.S.C. §371 of PCT/US2012/035138, filed Apr. 26, 2012.

BACKGROUND

Cloud services, be it private or public clouds, are gaining momentum. Maintaining availability of applications running on cloud systems and other types of systems is important. Hybrid cloud systems are becoming increasingly popular as private cloud systems seek to expand into public cloud functionality. The binding of private cloud systems to public cloud systems can affect the availability of applications running on the hybrid cloud system.

DETAILED DESCRIPTION

Examples of the present disclosure may include methods and systems for platform runtime abstraction. An example method for platform runtime abstraction may include creating a number of template models within a platform wherein the number of template models correspond to a provider model and creating a number of abstraction layers that allow a provider to plug into the platform at runtime wherein the provider includes a provider sub-system and the provider model. An example method for platform runtime abstraction can also include allowing the provider to plug into the platform at runtime through one of the number of abstraction layers wherein the provider remains independent of the platform and wherein the provider remains independent of a platform hardware infrastructure and a platform operating system infrastructure.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a" or "a number of" something can refer to one or more such things. For example, "a number of widgets" can refer to one or more widgets.

Hybrid could systems can combine two or more cloud systems. For example, a hybrid cloud system can combine a private cloud system and a public cloud system. A public cloud system can include a cloud system that makes applications, storage, and/or other resources available to the general public through a service provider. A private cloud system can include a cloud system that is operated solely by one entity for the use of that entity.

A hybrid cloud system can combine two or more cloud systems by combining the resources of the two or more cloud systems. For example, a hybrid cloud system can combine the hardware resources of a public cloud system with the monitoring resources of a private cloud system.

Hardware resources and software resources associated with a first cloud system can limit the use of an application in a second cloud system. For example, if a first cloud system is associated with a first operating system, then a second cloud system can only use monitoring resources, e.g., application, that are compatible with the second cloud system. In a number of examples of the present disclosure, a hybrid cloud system can combine two or more cloud systems that are independent of each other without limiting the use of an application.

Figure 1:
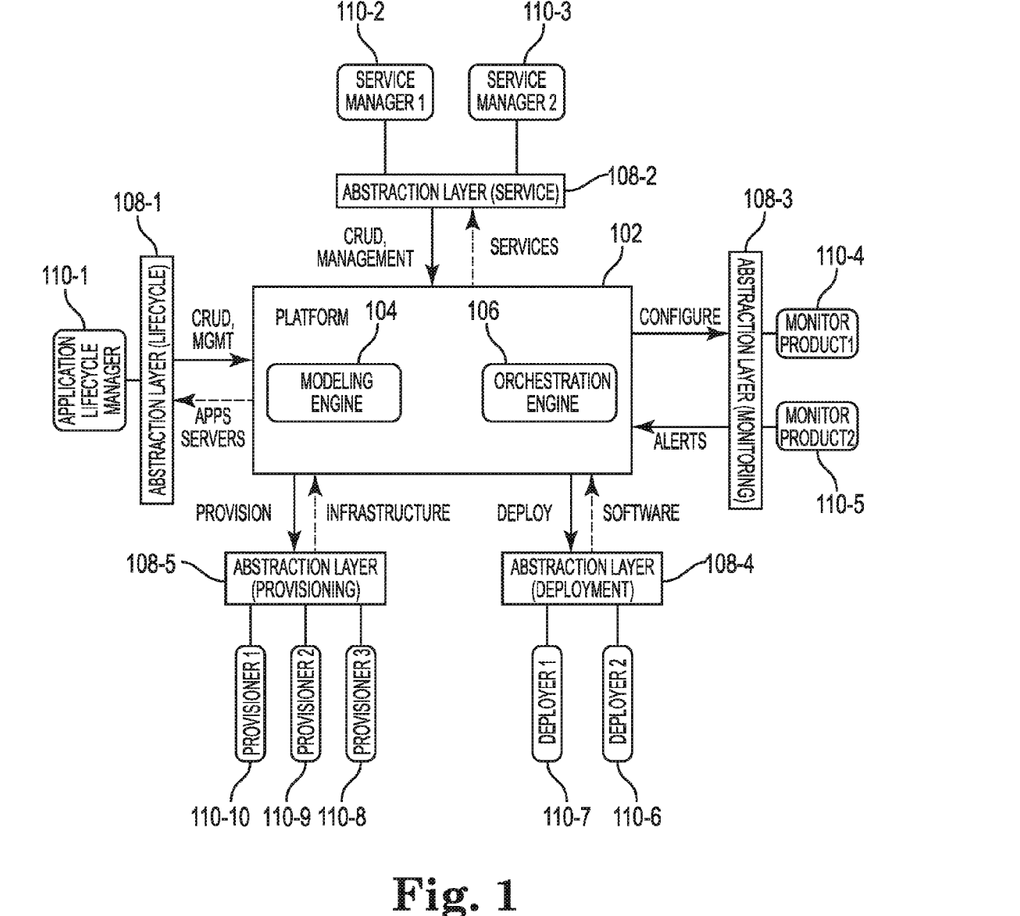
FIG. 1 illustrates an example of a platform for runtime abstraction according to the present disclosure.

FIG. 1 illustrates an example of a platform 102 for runtime abstraction according to the present disclosure. A platform 102 can bind a number of providers to each other. A provider can include a provider subsystem and a provider model. A provider can include a hardware subsystem, a software subsystem, and/or a combination of a hardware subsystem and a software subsystem. A provider can also include a provide resource wherein a provider can provide a provider resource to a platform. In a number of examples of the present disclosure, a platform 102 can bind an application lifecycle manager provider 110-1, a first service manager provider 110-2, a second service manager provider 110-3, a first monitor provider 110-4, a second monitor provider 110-5, a second deployment provider 110-6, a first deployment provider 110-7, a third provisioning provider 110-8, a second provisioning provider 110-9, and a first provisioning provider 110-10 (referred to generally as providers 110) to each other.

Binding a number of providers 110 can include loosely binding a number of providers 110 to each other and to a platform 102 when the number of providers 110 plug into a platform 102. A loose binding can include allowing a number of providers 110 to communicate with each other without being dependent on each other or on a form of communication with each other. A platform 102 can loosely bind a number of providers by acting as a fulfillment engine for the number of providers.

A platform 102 can act as a fulfillment engine for the number of providers by receiving a number of requests from one of the providers and by making the request to a different provider. That is, the platform 102 can fulfill the requests of one of the providers 110-1 without requiring the provider to communicate directly with the number of providers 110.

A platform 102 can include a modeling engine 104. A modeling engine 104 can facilitate the use of a number of artifacts stored in the platform. A number of artifacts can include an internal representation of a number of providers such that when a provider registers with the platform 102 an artifact is created. An artifact can correspond to a registered provider and to a provider model. An artifact can be represented as an object and/or a structure within the platform.

A platform 102 can also include an orchestration engine 106. The orchestration engine 106 can coordinate a flow of control of a number of artifacts. That is, a platform 102 can manage control of a number of artifacts through an orchestration engine. For example, an orchestration engine 106 can give control of a provider resource of a first provider to a second provider by giving the second provider control of an artifact that corresponds to the first provider. The orchestration engine 106 can coordinate a flow of control of an artifact by creating the flow of control and by terminating the flow of control. A flow of control can be created when a provider is given control of an artifact. In a number of examples of the present disclosure, an artifact can be controlled by a number of providers and/or a provider can control a number of artifacts. In a number of examples, an artifact can be controlled by a single provider and/or a provider can control a single artifact.

A number of providers 110 can be plugged into a platform 102 through a number of abstraction layers. For example, a number of abstraction layers can include a lifecycle abstraction layer 108-1, a service abstraction layer 108-2, a monitoring abstraction layer 108-3, a deployment abstraction layer 108-4, and a provisioning abstraction layer 108-5 (referred to generally as abstraction layers 108). A number of providers 110 can register with a platform 102 through a number of abstraction layers 108 at run time. A number of providers 110 can be loosely bound to each other through a platform 102. The bindings can be created when the providers 110 register with a platform 102. A provider can include a provider sub-system and a provider model. The provider sub-system can include a hardware sub-system and/or a software sub-system. A hardware sub-subsystem can include a number of hardware resources. A number of software sub-systems can include a number of software resources. A number of software resources can include compiled software and/or uncompiled software.

The abstraction layers 108 can include an interface that allows a number of providers 110 to communicate with a platform 102. An interface can include a set of code and/or an application programming interface (API). The abstraction layers 108 can allow the providers 110 to communicate with a platform 102 by normalizing a set messages, e.g., communication, between the providers 110 and the platform 102. A set of messages can be normalized by allowing two systems, e.g., providers 110 and platform 110, that have different communication formats to communicate with each other. Two systems, e.g., providers 110 and platform 110, can have different communication formats, for example, when a first system is based on a first operating system and a second system is based on a second operating system. Furthermore, two systems can have different communication formats when both systems share a similar operating system but the messages that comprise the communication are formatted differently. For example, different communication formats can include a first system that sends and receives messages that are formatted in a first format and a second system that sends and receives messages that are formatted in a second format wherein the first format and the second formats differ.

The abstraction layers 108 can include abstraction layers that are particular to a provider type. A provider type can be defined by characteristics that are shared by a subset of the number of providers. For example, a first provider type can include a number of providers that share a communication format. Sharing a communication format can include a number of communication formats that are substantially similar and/or a number of communication formats that share key similarities. Key similarities can include characteristics of a communication format that are required by a platform 102. In a number of examples, a provider type can include a number of providers that provide similar resources and/or consume similar resources. An abstraction layer can be particular to a provider type when an abstraction layer can alter messages that are in a first format used by providers of the provider type such that a platform 102 can receive the altered messages in a second format. For example, an application lifecycle manager provider 110-1 can communicate with a platform 102 through a lifecycle abstraction layer 108-1, a first service manager provider 110-2 and a second service manager provider 110-3 can communicate with a platform 102 through a service abstraction layer 108-2, a first monitor product provider 110-4 and a second monitor product provider 110-5 can communicate with a platform 102 through a monitoring abstraction layer 108-3, a second deployment provider 110-6 and a first deployment provider 110-7 can communicate with a platform 102 through a deployment abstraction layer 108-4, and a third provisioning provider 110-8, a second provisioning provider 110-9, and a first provisioning provider 110-10 can communicate with a platform 102 through a provisioning abstraction layer 108-5.

Figure 2:
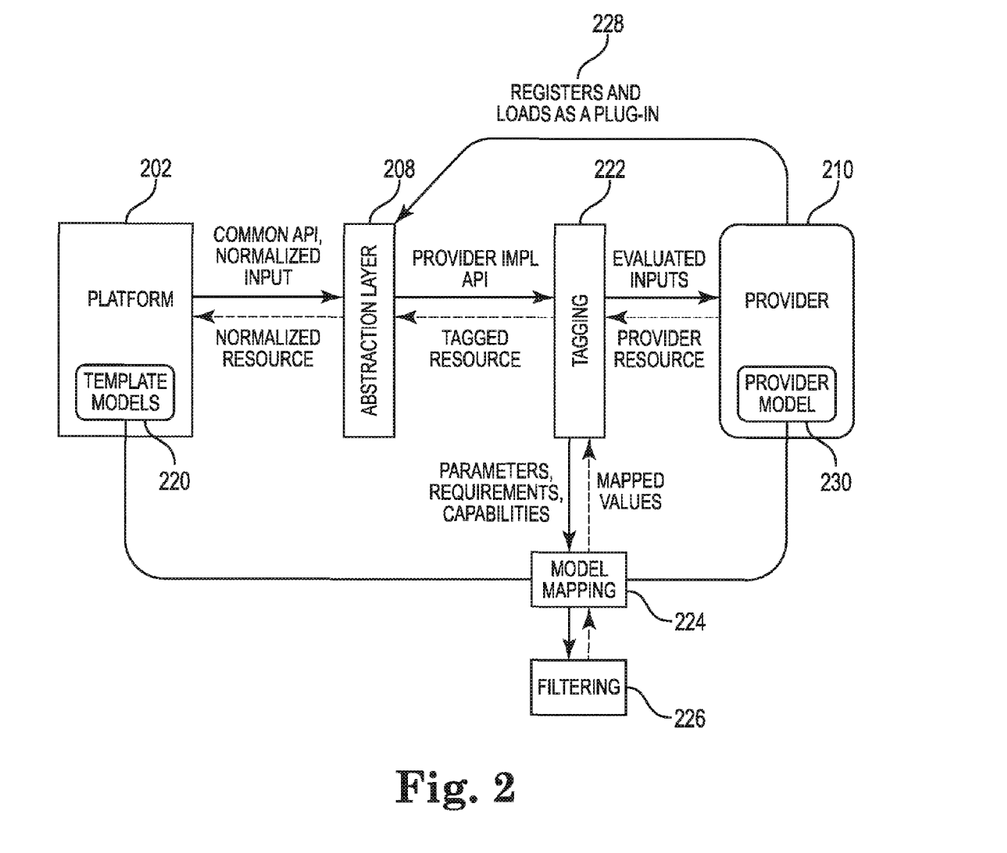
FIG. 2 illustrates an example for registering a provider according to the present disclosure.
Figure 3:
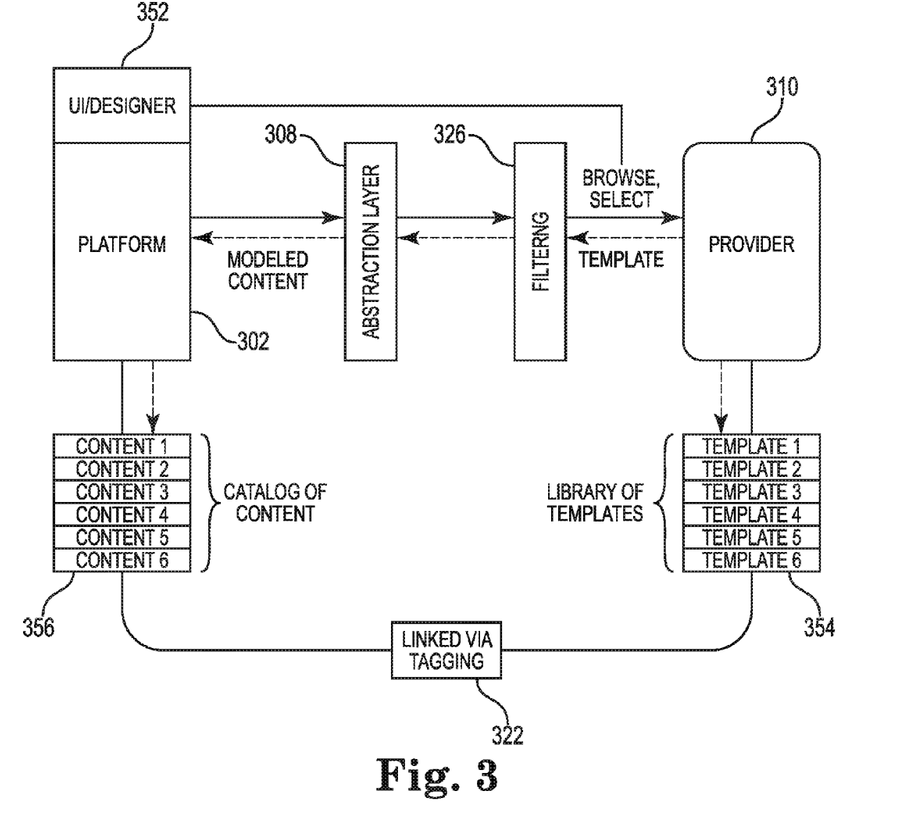
FIG. 3 illustrates an example for tagging a library of templates according to the present disclosure.

In FIG. 1, FIG. 2, and FIG. 3, communications between the providers 110, provider 210, and provider 310 and a platform 102, a platform 202, and a platform 302 through the abstraction layers 108, an abstraction layer 208, and an abstraction layer 308 can be denoted by solid lines and dotted lines. The solid lines can indicate a request and a reply. The dotted lines include a resource. The resources identified by dotted lines can include references to resources wherein the references can include a description of the resources and/or resource characteristics.

In a number of examples of the present disclosure, the abstraction layers 108 can be part of the platform 102. In some examples of the present disclosure, the abstraction layers 108 can be separate from the platform 102.

A provider model can include an internal representation of a provider sub-system wherein the provider model is internal to the provider. The provider model can be used to register a provider with a platform 102.

A number of providers can include a first group wherein the first group of providers consumes resources. For example, a number of service manager providers 110-2 and 110-3 can consume a number of resources that the number of providers 110 can provide. A number of providers can also include a second group of providers that provide resources. For example, a number of provisioning providers 110-8, 110-9, and 110-10 can provide resources. A number of providers can further include a third group of providers that consume resources and provide resources. For example, a number of deployment providers 110-6 and 110-7 can consume resources and provide resources.

A provisioning provider 110-8, 110-9, and 110-10 can include a number of processing systems, storage systems, and/or networking systems. A provisioning provider can include other types of hardware systems not included in the above examples. A provisioning provider can also include a provisioning provider that creates hardware infrastructures. For example, a provisioning provider can receive a request for a provision wherein a provision request can include a specific infrastructure configuration. Specific infrastructure configuration can include a specific server with a specific software configuration that meets the specifications found in a provision request. A specific infrastructure configuration can include more and/or less components. For example, a specific infrastructure configuration can include a network configuration and/or power usage configuration. A provisioning provider can respond to a provision request by providing infrastructure that meets the specifications found in the provision request. A provisioning provider can include a number of hardware systems and a number of software systems. A provisioning provider can include a number of different hardware configurations with a number of different software configurations. A provisioning abstraction layer can allow a provisioning provider, regardless of hardware configuration and/or software configuration, to communicate with a platform 102. A provisioning provider is not limited to hardware resources but can include virtual resources and/or cloud resources.

A deployment provider can install and configure software on a number of hardware resources. In a number of examples of the present disclosure, a number of different deployment providers can be used on any hardware system because the deployment provider resources can be made available through an abstraction layer 108-4. The deployment abstraction layer 108-4 can allow a number of deployment providers to communicate with a platform 102 regardless of the configurations of the deployment providers. That is, a number of deployment providers can be designed to function with a number of different operating systems. For example, a first deployment provider can be designed to function with a first operating system and a second deployment provider can be designed to function with a second operating system such that the first deployment provider is incompatible with the second operating system and the second deployment provider is incompatible with the first operating system. The platform 102 can normalize the interactions between a first deployment provider and a second operating system through a number of abstraction layers. The first deployment provider can make a first request wherein the first request is configured to be received by a first operating system. The first request can be configured such that the first operating system can understand the request but the second operating system cannot understand the request. If the first request is normalized through a first abstraction layer, then the platform 102 can receive the first request and configure the first request such that the second operating system can understand the second request. Normalizing a request can include receiving a request in a format that is known to the platform 102. The deployment abstraction layer 108-4 can allow a deployment provider to communicate with a platform 102 regardless of the deployment provider.

A deployment provider 110-7 and 110-6 can receive a deployment request from a platform 102 through a deployment abstraction layer 108. The deployment request can include a request to deploy software. Deploying software can include installing, activating, adapting, and updating software on a server. Deploying software can include more and/or less services than those listed above. For example, deploying software can include deactivating software. The deployment provider 110-7 and 110-6 can respond to a deployment request by returning an instance of the deployed software. Deployed software can include software that has been installed on a server and/or other computation device.

A monitoring product provider 110-4 and 110-5 can include a provider that monitors an object. An object can include a different provider, an application, a platform, and/or any other object. A monitoring product provider can receive a set of configurations, e.g., denoted in FIG. 1 as configure, and can send a number of alerts to the platform 102 when an object being monitored behaves in a predefined manner and/or does not behave in a predefined manner.

An application lifecycle manager provider 110-1 can manage an application throughout a number of lifecycles of an application. A number of lifecycles can include the different stages of an application. Different stages of an application can include conception, testing, and implementation. An application lifecycle manage provider 110-1 can communicate with a platform 102 through a lifecycle abstraction layer 108-1. An application lifecycle manager provider 110-1 can create, read, update, and delete, e.g., represented in FIG. 1 as CRUD, different application versions where each version of an application corresponds to a different lifecycle of an application. The Application lifecycle manager provider 110-1 can receive a number of references to an application that is being managed and/or a number of servers that are associated with an application that is being managed. Furthermore, an application lifecycle manager provider 110-1 can make a number of calls into a platform that affect the management of the different lifecycles of an application. An application lifecycle manager provider 110-1 can receive a number of application versions and/or a number of references to where those application versions can be stored.

A service management provider 110-2 and 110-3 can manage a number of services. For example, a service management provider 110-2 and 110-3 can include a development service management provider 110-2 and/or an email service management provider 110-3. However, a service management provider can include management of a number of services not included in the above example. A service management provider can create, read, update, and delete, e.g., represented in FIG. 1 as CRUD, a number of objects related to a service that is managed. A service management provider can create, read, update, and delete a number of objects by making a management call to the platform 102 through a service abstraction layer 108-2. A service management provider 110-2 and 110-3 can make management calls to a platform 102. Management calls to a platform 102 can manage a service. A platform 102 can return a service resource that is being managed which is denoted in FIG. 1 by a dotted line labeled services connecting the platform 102 to the abstraction layer 108-2. For example, a platform 102 can return an email to an email service manager provider 110-3.

FIG. 2 illustrates an example for registering a provider 210 according to the present disclosure. A platform 202 can include a number of template models 220. A number of template models 220 can include an internal, e.g., internal to a platform 202, representation of a number of provider models. A provider model 230 can include a representation of the provider resources. A provider 210 can register 228 with a platform 202 by tagging the provider model 230 such that the template model 220 represents the provider model 230 and the provider resources.

A platform 202 can register a provider 210 by requesting a normalized input through a set of common APIs. A normalized input can include a representation of provider resources in a format that is accessible to the platform 202. The abstraction layer 208 can receive the request for a normalized input and forward the request through a provider implemented API to a tagging layer 222. A provider implemented API can include an API that defines a communication format that is accessible to the provider 210. A tagging layer 222 can receive the request from the abstraction layer 208 and send an evaluated input request. The evaluated input request can include a specific call to the provider 210.

The provider 210 can process the evaluated input request and respond with a message that includes a provider resource wherein the message and the provider resource are in a format that is accessible to the provider 210. A provider resource can be defined in relation to a provider model 230. A tagging layer 220 can receive the message that includes a provider resource and tag the provider resource, e.g., the provider model 230, such that the tagged resource includes a representation of the provider model 230 in a format that the platform 202 can process. An abstraction layer 208 can receive the tagged resource and send a normalized resource to the platform 202. The normalized resource can include a message that is accessible to the platform 202 wherein the message includes a tagged provider model 230.

In a number of examples of the present disclosure, a tagging layer 222 can be part of the abstraction layer 208. In some examples of the present disclosure, a tagging layer 222 can be independent from the abstraction layer 208. A tagging layer can include a model mapping module 224 that receives the parameters associated with the provider model 230, the requirements associated with the provider model 230, and the capabilities associated with the provider model 230. The model mapping module 224 then filters, e.g., through a filtering module 226, a list of provider resources that are included in provider model 230 to identify a set of model resources requested by one of the template models 220. A list of provider resources and a set of model resources can include the parameters, requirements, capabilities of a number of resources that are provider by provider 210. The model mapping module 224 can return a set of mapped values. That is, the provider model 230 can be mapped onto the template model 220. In a number of examples, the mapping can occur at runtime. In some examples, the mapping can occur after runtime. For example, if provider 210 can provide a hosting service with a dynamically allocated Internet Protocol (IP) address, then the tagging layer 222 can tag the dynamically allocated IP address after runtime.

In some examples of the present disclosure, the model mapping module 224 and the filtering module 226 can be internal to the tagging layer 222 and the abstraction layer 208. In a number of examples of the present disclosure, the model mapping module 224 and the filtering module 226 can be independent of the abstraction layer 208 and the tagging layer 222.

The provider 210 can be registered with the platform 202 at runtime. That is, the provider 210 can be plugged into the platform 202 at runtime. Plugging the provider 210 into the platform 202 at runtime allows for the provider model 230 to be reused with a number of platforms by changing an abstraction layer 208 and/or by making changes to the provider model 230. The reuse of the provider model 230 allows for portability of the provider 210 wherein portability of the provider 210 includes the ability to use the provider 210 in a number of platforms while allowing the provider model 230 to be reused. A number of platforms can include a number of platforms that include different providers. For example, a first platform can include a first provider and a second provider and a second platform can include a third provider. The first provider can be reused and plugged into the second platform without modifying the first provider to make it compatible with the third provider. A template model 220, which can be linked to the provider model 230 at runtime, can be updated after runtime. An update can be initiated by the platform 202 and/or by the provider 210 as the provider model 230 changes.

Plugging a provider 210 into a platform 202 at runtime can include mapping a provider model 230 onto a template model 220. Mapping a provider model 230 onto a template model 220 can include binding a provider 210 with a number of providers that can be plugged into a platform 202. The abstraction layer 208 and the tagging layer 222 allow a provider 210 to plug into a platform 202 while the provider 210 remains independent of the platform 202. The provider 210 can remain independent of a platform 202 by remaining independent of hardware and/or software components associated with a platform 202 and a number of providers that are bound and/or can be bound to platform 202.

Hardware can include a number of hardware components that are associated with a platform 202. For example, hardware can include a computer system that is associated with a platform 202. Hardware is not limited to computer systems but can include networking components, memory components, and other computation related components associated with a platform. Hardware can also include a number of hardware components that can be associated with a number of providers. For example, a number of providers, including a provider 210, can be plugged into a platform and each of the number of providers can be associated with a number of hardware components that can be used to provide a number of provider resources. Each of the providers can remain independent from the hardware components of the other providers.

A provider 210 can remain independent from the software components of a platform and the software components of a number of providers. Software components can include a number of operating systems and/or computer readable instructions. Software components are not limited to the above examples of software components and can include other examples of software components.

A provider 210 can remain independent from a platform 202 because the communications between a platform 202 and a provider 210 can be normalized through an abstraction layer 208. A provider 210 can remain independent from a number of providers that are plugged into the platform 202 because the interactions between a provider 210 and a number of providers that are plugged into the platform 202 can be normalized through the platform 202. That is, an abstraction layer 208 can allow a provider 210 to communicate with a platform 202 and a number or providers without having to change the provider model 230 and/or a communication format that is native to a provider.

FIG. 3 illustrates an example for tagging 322 a library of templates 354 according to the present disclosure. A library of templates 354 can include content that is native to a provider 310. For example, a library of templates 354 can include content that can be expressed through a number of formats. Content can include text, formulas, and/or any other expression of a content native to a provider 310. The library of templates 354 can include a set of content.

A designer 352, through a user interface (UI), can browse the library of templates 354 in the provider 310 through an abstraction layer 308 and/or a filtering layer 326. A designer 352 can include a user that is building a platform 302. A user can build a platform 302 by selecting a number of providers that will plug into a platform 302. A user can include a physical user or an automated user. A designer 352 can select a number of templates from the library of templates 354. The templates that the designer 352 selects can be returned through a filtering layer 326 and the abstraction layer 308 to a platform as modeled content. The modeled content can be included in a catalog of content 356 such that the catalog of content 356 can include a number of templates from a number of providers.

A platform 302 can offer the content, e.g., the catalog of the content 356, to a user and/or an application by tagging 322 a number of templates. The platform 302 does not have to understand the number of templates to tag the number of templates. That is, a user and/or an application can select content from the catalog of content 356 without the user and/or the platform 302 fully understanding the content.

In FIG. 3, the connection between a library of templates 354 and a catalog of content 356 through the linked via tagging 322 can constitute a conceptual representation of the tagging process and is included in the flow between the platform 302, the abstraction layer 308, the filtering layer 326, and the provider 310.

Figure 4:
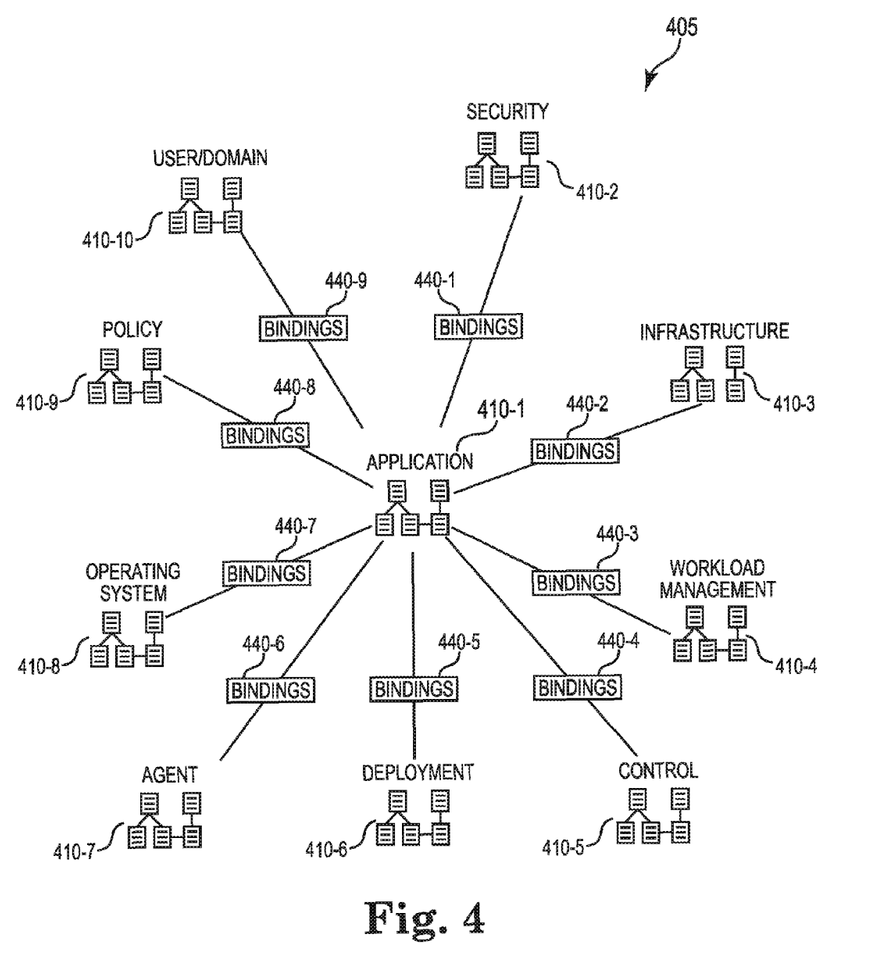
FIG. 4 illustrates an example of a number of bindings between platforms according to the present disclosure.

FIG. 4 illustrates an example of a number of bindings between platforms according to the present disclosure. In a number of examples of the present disclosure, an application provider 410-1 can be bound to a number of providers through a platform. That is, a platform can be created and designed to support an application provider. A platform can support an application provider 410-1 by making a number of resources available to the application provider 410-1 through a number of providers. An application provider can include an application model that represents application resources. A fully constructed platform 405 can include a number of bindings with a number of platforms.

A number of providers can include a security provider 410-2, an infrastructure provider 410-3, a workload management provider 410-4, a control provider 410-5, a deployment provider 410-6, an agent provider 410-7, an operating system provider 410-8, a policy provider 410-9, and a user/domain provider 410-10 (referred to generally as providers 410). In a number of examples of the present disclosure, a number of providers can include more or less providers than those included in the above example. Moreover, the providers listed above are illustrative and can include different providers that provide different resources.

The application provider 410-1 can be loosely bound to the number of providers 410. For example, an application provider 410-1 can be loosely bound to a security provider 410-2 through binding 440-1, to an infrastructure provider 410-3 through binding 440-2, to a workload management provider 410-4 through binding 440-3, to a control provider 410-5 through binding 440-4, to a deployment provider 410-6 through binding 440-5, to an agent provider 410-7 through binding 440-6, to an operating system provider through binding 440-7, to a policy provider through binding 440-8, and to a user/domain provider 410-10 through binding 440-9.

The application provider 410-1 can be bound to a number of providers 410 at runtime. A platform can bind an application provider 410-1 to a number of providers 410. The bindings can include loose bindings because an application provider 410-1 can be bound to a number of providers 410 without altering an application model within the application provider 410-1 and without the application provider 410-1 communicating directly with the number of providers 410. This runtime building block construct can allow the creation of a platform that includes the application provider 410-1 and the number of providers 410. The platform can be altered dynamically at runtime without affecting the application provider 410-1 and the number of providers 410. For example, if a platform includes a deployment provider 410-6 that is an open source deployment provider 410-6, then the open source deployment provider 410-6 can be exchanged with a proprietary deployment provider without affecting the other providers that are part of the platform.

Figure 5:
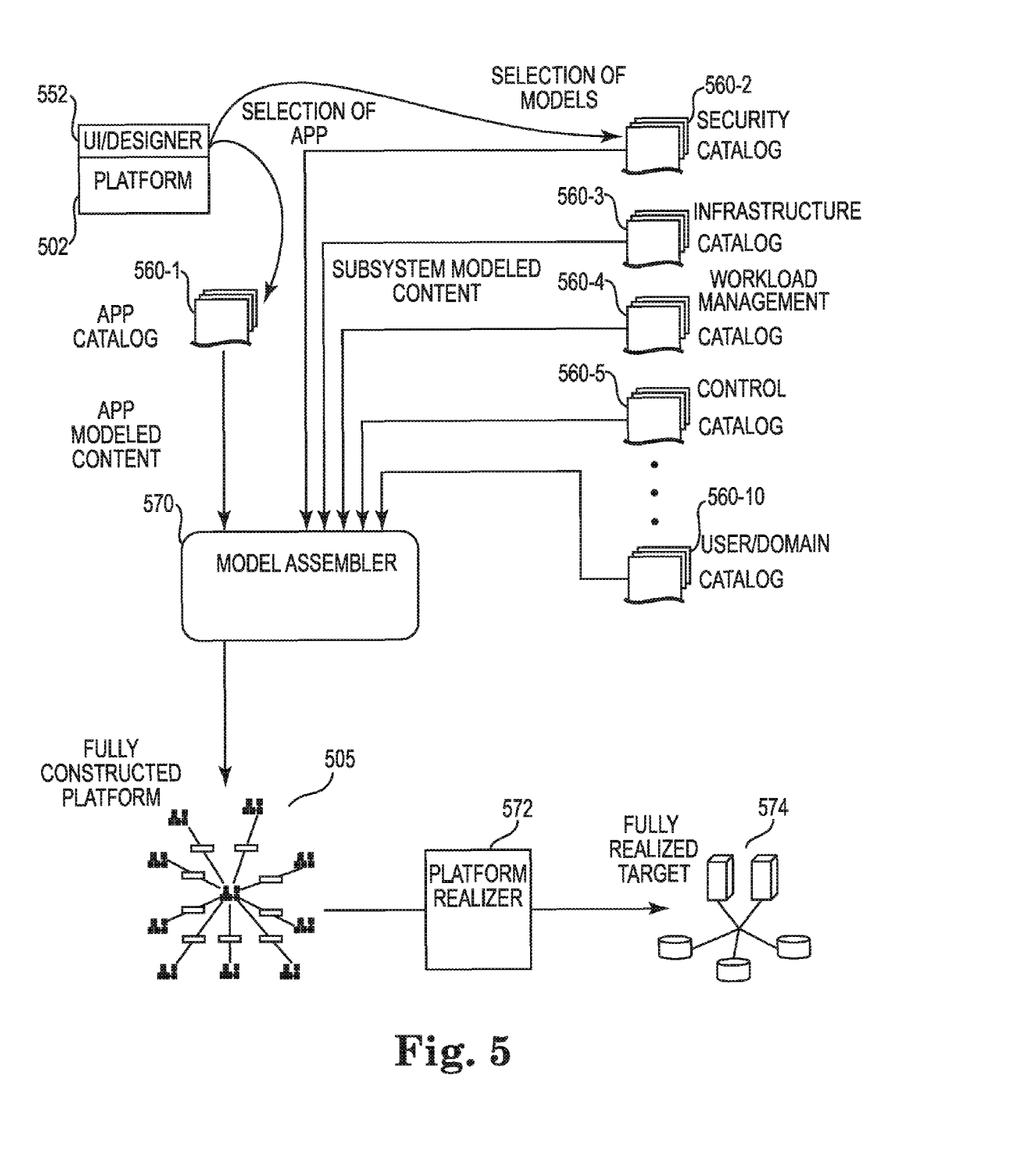
FIG. 5 illustrates a flow chart illustrating an example of platform runtime abstraction according to the present disclosure.

FIG. 5 illustrates a flow chart 507 illustrating an example of platform runtime abstraction according to the present disclosure. A designer 552 can design a platform 502 by selecting an application provider and a number of providers that can be bound to the platform. The designer 552 can select the number of providers from an application catalog 560-1 and a number of provider catalogs. A number of provider catalogs can include a security catalog 560-2, an infrastructure catalog 560-3, a workload management catalog 560-4, a control catalog 560-5, a deployment catalog 560-6 (not shown), an agent catalog 560-7 (not shown), an operating system catalog 560-8 (not shown), a policy catalog 560-9 (not shown), and a user/domain catalog 560-10 (referred to generally as provider catalogs 560).

An application catalog and a number of provider catalogs can include a description of the providers that enables a designer 552 to select a group of providers that will function together to support the application provider. For example, a designer 552 can determine that an application provider requires a number of provider resources to function. The designer 552 can review a number of provider catalogs 560 that describe a number of providers. The designer 552 can select those providers from the number of providers that can provide the required provider resources. The designer 552 can select the application provider 560-1 and the number of providers 560 before runtime. In a number of examples of the present disclosure, the designer 552 can select the application provider 560-1 and the number of providers 560 at run time. In some examples, the designer 552 can modify the selections after runtime.

The model assembler 570 can construct a provider model at runtime. The model assembler 570 can be part of a modeling engine, e.g., modeling engine 104 in FIG. 1. The model assembler 570 can bind an application provider and a number of providers to a platform at run time. The fully constructed platform 505 can be realized 574 by a platform realizer 572 at runtime wherein the platform realizer 572 can be part of an orchestration engine, e.g., orchestration engine 106 in FIG. 1.

Figure 6:
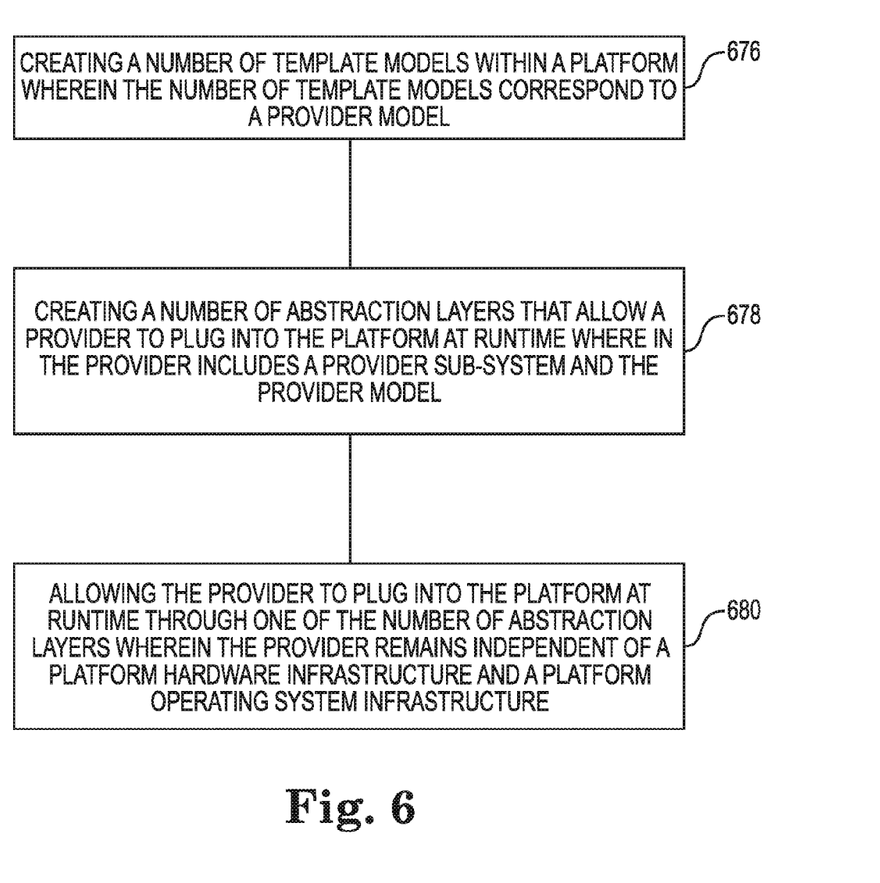
FIG. 6 is a flow chart illustrating an example of a method for platform runtime abstraction.

FIG. 6 is a flow chart illustrating an example of a method for platform runtime abstraction. At 676, a number of template models can be created within a platform wherein the number of template models corresponds to a provider model. At 678 a number of abstraction layers that allow a provider to plug into the platform at runtime can be created, wherein the provider includes a provider sub-system and the provider model. At 680, the provider can be allowed to plug into the platform at runtime through one of the number of abstraction layers wherein the provider remains independent of a platform hardware infrastructure and a platform operating system infrastructure.

In a number of examples of the present disclosure, the platform can include a modeling engine that facilitates the use of a number of artifacts stored in the platform wherein the number of artifacts includes a provider artifact and wherein the provider artifact can be created when the provider plugs into the platform. The platform can also include an orchestrating engine. The orchestrating engine can coordinate a flow of control of a number of artifacts by giving a provider control of an artifact and by terminating the control of an artifact. In a number of examples of the present disclosure, an artifact can be controlled by a number of providers and/or a provider can control a number of artifacts. In some examples of the present disclosure, an artifact can be controlled by a single provider and/or a provider can control a single artifact.

A number of abstraction layers can include a number of abstraction layers that are particular to a provider type. A provider type can include a number of providers that share a communication format. Each provider type can include an abstraction layer such that a number of providers from a number of provider types can communicate with a platform through a number of abstraction layers that are particular to the provider type.

A provider can plug into a platform by binding a provider model with a template model. A platform can include a number of template models that represent a number of provider models. The binding can include a number of messages that tag a provider model where in the tagging binds a provider model to a template model.

Figure 7:
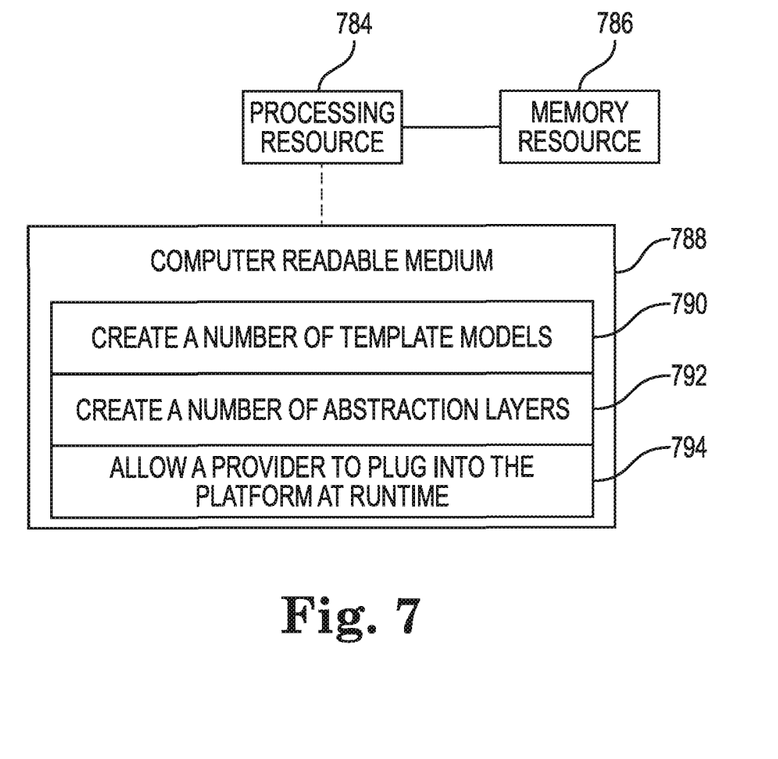
FIG. 7 illustrates a block diagram of an example of a machine-readable medium in communication with processing resources for platform runtime abstraction according to the present disclosure.

FIG. 7 illustrates a block diagram of an example of a computer-readable medium in communication with processing resources for platform runtime abstraction according to the present disclosure. The computer readable medium 788 (e.g., a tangible, non-transitory medium) and/or the memory resource 786 can store a set of instructions executable by the processing resource 784 to create 790 a number of template models within a platform wherein the number of template models correspond to a provider model. The instructions can be executed to create 792 a number of abstraction layers that allow a provider to plug into the platform at runtime wherein the provider includes a provider sub-system and the provider model. The instructions can be executed to allow 794 the provider to plug into the platform at runtime through one of the number of abstraction layers wherein the provider remains independent of the platform and wherein the provider remains independent of a platform hardware infrastructure and a platform operating system infrastructure.

The abstraction layer and the tagging layer can tag a library of provider templates and link the provider templates into a catalog of content, wherein a provider includes a library of provider templates and a platform includes a catalog of content. A library of provider templates can include list of the services that a provider can provider and a description of the lists of services that a provider can provider. The library of provider templates can be linked into a catalog of content to provide a list of service that a number of providers can provide and a description of the list of services that the number of providers can provider. A catalog of content can be provided within a platform to allow a number of platforms to remain independent from each other.

A provider can remain independent from a platform and from a number of providers. A provider can remain independent from a platform operating system infrastructure and a number of provider operating system infrastructures. The platform operating system can include an operating system that is associated with a platform. A provider operating system can include an operating system that is associated with a number of providers.

A number of providers can include an application lifecycle manage provider that manages a lifecycle of a product wherein the lifecycle include a number of states of the product that progress from development to production of the product. A number of providers can further include a provisioner provider that provides a number of hardware resources to the platform wherein the number of hardware resources include a number of different hardware resources with a number of different operating systems. A number of providers can also include a deployer provider that configures and installs software on a number of provisioner providers. A number of providers can include a monitor provider that monitors the number of providers and alerts the platform when performance issues are detected. A number of providers can include a service manager provider that manages a number of services that are provided through the number of providers.

The methods, techniques, systems, and apparatuses described herein may be implemented in digital electronic circuitry or computer hardware, for example, by executing instructions stored in computer-readable storage media. Apparatuses implementing these techniques may include appropriate input and output devices, a computer processor, and/or a tangible computer-readable storage medium storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and the desired results still may be achieved. Similarly, components in the disclosed systems may be combined in a different manner and/or replaced or supplemented by other components and the desired results still may be achieved.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A method for platform runtime abstraction, comprising:
creating template models within a platform, wherein the template models correspond to respective provider models that represent provider resources included in respective providers, wherein each of the providers further includes a hardware subsystem, and the providers comprise a lifecycle manage provider that manages a lifecycle of a product, wherein the lifecycle includes a number of states of the product that progress from development to production of the product, a provisioner provider that provides hardware resources to the platform, wherein the hardware resources include different hardware resources with different operating systems, and a deployer provider that configures and installs software on provisioner providers;
providing a number of abstraction layers that allow the respective providers to plug into the platform at runtime, wherein each provider that is plugged into the platform remains independent of a platform hardware infrastructure and a platform operating system infrastructure of the platform; and
binding a first provider of the providers and a second provider of the providers that have plugged into the platform such that the first provider is able to use a provider resource of the second provider through the platform.

2. The method of claim 1, further comprising providing, by a modeling engine in the platform, provider artifacts in the platform, the provider artifacts created when the providers plug into the platform, and the provider artifacts including representations of the providers.

3. The method of claim 2, further comprising coordinating, by an orchestrating engine in the platform, a flow of control of the provider artifacts, wherein the orchestration engine gives the first provider control of the provider artifact representing the second provider such that the first provider has control of the provider resource of the second provider.

4. The method of claim 1, further comprising converting, by a first abstraction layer of the abstraction layers, between a communication format of the platform and a different communication format of the first provider.

5. The method of claim 1, wherein the provider resource of the second provider used by the first provider comprises a hardware resource of the second provider.

6. The method of claim 1, further comprising registering, by the platform, the second provider with the platform, wherein the registering comprises receiving, by the platform from the second provider, a representation of provider resources of the second provider.

7. The method of claim 6, further comprising mapping, as part of plugging the second provider into the platform, the provider model for the second provider to a template model of the template models.

8. The method of claim 1, further comprising binding the first provider and a third provider of the providers that has plugged into the platform such that the first provider is able to further use a provider resource of the third provider through the platform.

9. The method of claim 8, wherein the binding of the first provider and the second and third providers comprises a binding wherein the provider models for the first, second, and third providers are un-altered, and the first provider communicates indirectly with the second and third providers through the platform.

10. A system, comprising:
a platform comprising template models, the platform to register and load providers at runtime, wherein after the registering and loading of the providers with the platform the providers remain independent from a platform hardware infrastructure of the platform, wherein each provider of the providers include a provider resource and a hardware subsystem, and the providers comprise a lifecycle manage provider that manages a lifecycle of a product, wherein the lifecycle includes a number of states of the product that progress from development to production of the product, a provisioner provider that provides hardware resources to the platform, wherein the hardware resources include different hardware resources with different operating systems, and a deployer provider that configures and installs software on provisioner providers;
abstraction layers comprising interfaces through which the respective providers communicate with the platform;
a tagging layer to tag at runtime provider models representing the providers with tags to bind the provider models to respective template models of the template models;
at least one processor; and
a non-transitory storage medium storing instructions executable on the at least one processor to bind a first provider of the providers with second providers of the providers that have plugged into the platform such that the first provider is able to use provider resources of the second providers through the platform.

11. The system of claim 10, further comprising orchestration instructions executable on the at least one processor to give, to the first provider, control of artifacts within the platform, to allow the first provider to have control of the provider resources of the second providers, wherein the artifacts are included in the platform and represent the second providers.

12. The system of claim 10, wherein the tagging layer is to:
tag a library of provider templates, and
link the library of provider templates into a catalog of content within the platform, and wherein the library of provider templates includes a description of the services that each of the providers provide.

13. The system of claim 12, wherein the catalog of content includes a description of a list of services that the platform provides through the providers to a particular provider.

14. The system of claim, 10 wherein the providers loaded with the platform remain independent from a platform operating system infrastructure and provider operating system infrastructures.

15. The system of claim 10, wherein the providers further include:
a monitor provider that monitors the providers and alerts the platform when performance issues are detected; and
a service manager provider that manages services that are provided through the providers.

16. A non-transitory computer-readable medium storing instructions for platform runtime abstraction executable by a system to cause the system to:
provide a platform that includes:
a modeling engine to facilitate use of provider artifacts that correspond to respective providers, and
an orchestrating engine to coordinate a flow of control of the provider artifacts;
provide abstraction layers that allow the providers to plug into the platform at runtime, wherein each provider of the providers includes a provider resource, a hardware subsystem, and a provider model that represents the provider, and the providers comprise a lifecycle manage provider that manages a lifecycle of a product, wherein the lifecycle includes a number of states of the product that progress from development to production of the product, a provisioner provider that provides hardware resources to the platform, wherein the hardware resources include different hardware resources with different operating systems, and a deployer provider that configures and installs software on provisioner providers;
allow the providers to plug into the platform at runtime through the abstraction layers, wherein the provider models remain independent of a platform infrastructure of the platform; and
give, by the orchestrating engine to a first provider of the providers, control of the provider artifact corresponding to a second provider of the providers such that the first provider has control of the provider resource of the second provider.

17. The non-transitory computer-readable medium of claim 16, wherein the providers include a first group of providers that consumes provider resources, and a second group of providers that provides provider resources, wherein the first provider is part of the first group of providers, and the second provider is part of the second group of providers.

18. The non-transitory computer-readable medium of claim 17, wherein the first group of providers use the provider resources of the second group of providers without interacting directly with the second group of providers.

19. The non-transitory computer-readable medium of claim 16, wherein control of the providers is managed through the respective provider artifacts.

20. The non-transitory computer-readable medium of claim 16, wherein the instructions are executable to cause the system to link, as part of plugging the second provider into the platform, the provider model for the second provider to a template model that is part of the platform.

* * * * *